(12) United States Patent
Ljung (10) Patent No.: US 7,643,798 B2
(45) Date of Patent: Jan. 5, 2010

(54) PASSIVE NFC ACTIVATION OF SHORT DISTANCE WIRELESS COMMUNICATION

(75) Inventor: Peter Ljung, Malmö (SE)

(73) Assignee: Sony Ericsson Mobile Communications AB, Lund (SE)

( * ) Notice: Subject to any disclaimer, the term of this patent is extended or adjusted under 35 U.S.C. 154(b) by 599 days.

(21) Appl. No.: 11/297,338

(22) Filed: Dec. 9, 2005

(65) Prior Publication Data
US 2007/0135078 A1 Jun. 14, 2007

(51) Int. Cl.
H04B 7/00 (2006.01)
(52) U.S. Cl. ............. 455/41.3; 455/41.2; 455/574; 455/343.2; 340/10.33; 340/572.1
(58) Field of Classification Search ............. 455/41.3, 455/41.2, 574, 343.2, 343.3; 340/10.33, 340/572.1, 572.2
See application file for complete search history.

(56) References Cited

U.S. PATENT DOCUMENTS

| | | | |
|---|---|---|---|
| 6,865,398 B2* | 3/2005 | Mangal et al. ............. 455/552.1 |
| 7,236,742 B2* | 6/2007 | Hall et al. .................. 455/41.3 |
| 7,327,252 B2* | 2/2008 | Goehler ................. 340/539.13 |
| 7,400,253 B2* | 7/2008 | Cohen ...................... 340/572.1 |
| 2003/0187787 A1* | 10/2003 | Freund ......................... 705/39 |
| 2004/0024884 A1 | 2/2004 | Rekimoto et al. ........... 709/228 |
| 2004/0077313 A1 | 4/2004 | Oba et al. .................. 455/41.2 |
| 2004/0186768 A1* | 9/2004 | Wakim et al. .................. 705/14 |
| 2004/0203352 A1* | 10/2004 | Hall et al. ................... 455/41.1 |
| 2004/0210498 A1* | 10/2004 | Freund ......................... 705/30 |
| 2004/0259499 A1 | 12/2004 | Oba et al. .................. 455/41.2 |
| 2005/0015467 A1 | 1/2005 | Noda ........................ 709/220 |
| 2005/0025117 A1 | 2/2005 | Inagaki et al. ............... 370/350 |
| 2005/0242921 A1* | 11/2005 | Zimmerman et al. ......... 340/5.2 |
| 2006/0111053 A1* | 5/2006 | Wu et al. ................... 455/90.3 |
| 2006/0218626 A1* | 9/2006 | Goehler ......................... 726/5 |
| 2006/0273894 A1* | 12/2006 | Goehler ................. 340/539.13 |
| 2007/0093200 A1* | 4/2007 | Dobosz ..................... 455/3.02 |
| 2007/0109121 A1* | 5/2007 | Cohen ................... 340/539.26 |
| 2008/0009313 A1* | 1/2008 | Ishii ........................ 455/556.1 |
| 2008/0101400 A1* | 5/2008 | Auterinen .................... 370/463 |
| 2008/0136635 A1* | 6/2008 | Malik ....................... 340/572.1 |
| 2008/0169927 A1* | 7/2008 | Graves et al. ............ 340/572.1 |

FOREIGN PATENT DOCUMENTS

WO WO 89/05549 A1 6/1989

(Continued)

OTHER PUBLICATIONS

International Search Report and Written Opinion dated Nov. 2, 2006, issued in corresponding PCT Application No. PCT/IB2006/001545.

(Continued)

Primary Examiner—Minh D Dao
(74) Attorney, Agent, or Firm—Harrity & Harrity, LLP (57) ABSTRACT

A mobile terminal includes a passive wireless receiver and a wireless transceiver. The passive wireless receiver receives a first activation signal from another mobile terminal, and transmits a second activation signal using power from the first activation signal. The wireless transceiver receives the second activation signal, and establishes a wireless connection with the other mobile terminal in response to receiving the second activation signal.

19 Claims, 4 Drawing Sheets

FOREIGN PATENT DOCUMENTS

WO    WO 2005/043810 A2    5/2005
WO    WO 2005/093644 A1    10/2005

OTHER PUBLICATIONS

J. Flores et al., "Performance of RFID Tags in Near and Far Field", Personal Wireless Communications, 2005, ICPWC 2005, 2005 IEEE International Conference on New Delhi, India, Jan. 23-25, 2005, Piscataway, NJ, USA, IEEE, Jan. 23, 2005, pp. 353-357, XP010798579, ISBN: 0-7803-8964-6.

"Near Field Communication, White Paper," ECMA International, Mar. 2004, pp. 1-9, XP002403609.

Near Field Communication White Paper, http://www.ecma-international.org/activities/Communications/2004tg19-001.pdf, 2004, 9 pages.

About NFC Technology, http://www.nfc-forum.orq/aboutnfc/about_nfc_technology, printed Dec. 9, 2005, 1 page.

* cited by examiner

PASSIVE NFC ACTIVATION OF SHORT DISTANCE WIRELESS COMMUNICATION

BACKGROUND

1. Technical Field of the Invention

Implementations described herein relate generally to mobile terminals and, more particularly, to using passive near field communication (NFC) to activate a mobile terminal for wireless communications.

2. Description of Related Art

Several short distance wireless communication protocols, such as Bluetooth and IEEE 802.11 (wireless local area network or WLAN) exist that allow for two wireless devices, such as mobile terminals, to communicate. Different scanning schemes are used to adapt to changes in the ad-hoc networks that are created between these wireless devices. In these different scanning schemes, each scan consumes power, which decreases the standby time of the mobile terminal. To decrease the power consumption associated with these scans, the time between each scan can be increased. This increase, however, leads to a longer activation/connection time.

SUMMARY

According to one aspect, a method, performed by a first mobile terminal, comprises receiving a wireless signal from a second mobile terminal, and using power from the wireless signal to begin establishing a wireless connection with the second mobile terminal.

Additionally, the wireless signal may be transmitted using a NFC protocol.

Additionally, the receiving a wireless signal includes receiving the wireless signal via a passive wireless receiver.

Additionally, the using power from the wireless signal includes using power from the wireless signal to transmit a signal from the passive wireless receiver to a wireless transceiver within the first mobile terminal.

Additionally, the wireless connection includes a short distance wireless connection.

Additionally, the short distance wireless connection includes one of a Bluetooth connection or an IEEE 802.11 connection.

Additionally, the first mobile terminal performs no scanning prior to receiving the wireless signal.

Additionally, the using the power from the wireless signal includes using power from the wireless signal to activate scanning in a wireless transceiver.

Additionally, the scanning includes a high frequency scan to decrease connection time.

Additionally, the wireless signal is associated with information identifying the first mobile terminal.

According to another aspect, a mobile terminal includes a passive wireless transceiver and a wireless transceiver. The passive wireless receiver receives a first activation signal from another mobile terminal, and transmits a second activation signal using power from the first activation signal. The wireless transceiver receives the second activation signal, and establishes a wireless connection with the other mobile terminal in response to receiving the second activation signal.

Additionally, the passive wireless transceiver receives the activation signal via a NFC protocol.

Additionally, when transmitting the second activation signal, the passive wireless receiver is configured to transmit the second activation signal via a bus.

Additionally, the mobile terminal includes a mobile telephone.

Additionally, when establishing a wireless connection, the wireless transceiver is configured to establish a short distance wireless connection with the other mobile terminal.

Additionally, scanning is deactivated in the wireless transceiver prior to receiving the second activation signal, and when establishing a wireless connection, the wireless transceiver is configured to perform scanning.

Additionally, when performing the scanning, the wireless transceiver is configured to perform a high frequency scan.

Additionally, the first activation signal is associated with identification information. The identification information identifies the mobile terminal.

Additionally, the wireless transceiver consumes no power prior to receiving the second activation signal.

Additionally, the wireless transceiver is powered up in response to receiving the second activation signal According to yet another aspect, a network device comprises means for receiving a first activation signal using a NFC protocol, and means for transmitting a second activation signal in response to receiving the first activation signal. Power for transmitting the second activation signal is drawn from the first activation signal. The second activation signal is used to power up a wireless transceiver within the network device.

According to still another aspect, a method comprises receiving, at a passive NFC receiver, a NFC signal from a mobile terminal; transmitting, in response to receiving the NFC signal, an activation signal to a wireless transceiver by drawing power from the received NFC signal; and automatically establishing, via the wireless transceiver, a short distance wireless connection with the mobile terminal in response to receiving the activation signal.

Additionally, the short distance wireless connection includes at least one of a Bluetooth connection or an IEEE 802.11 connection.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION OF EMBODIMENTS

The following detailed description of the invention refers to the accompanying drawings. The same reference numbers in different drawings may identify the same or similar elements. Also, the following detailed description does not limit the invention.

Implementations consistent with the principles of the invention may provide a totally passive mobile terminal that uses power from an activation signal from another mobile terminal to activate its wireless transceiver logic to begin establishing a wireless connection.

Exemplary System

Figure 1:
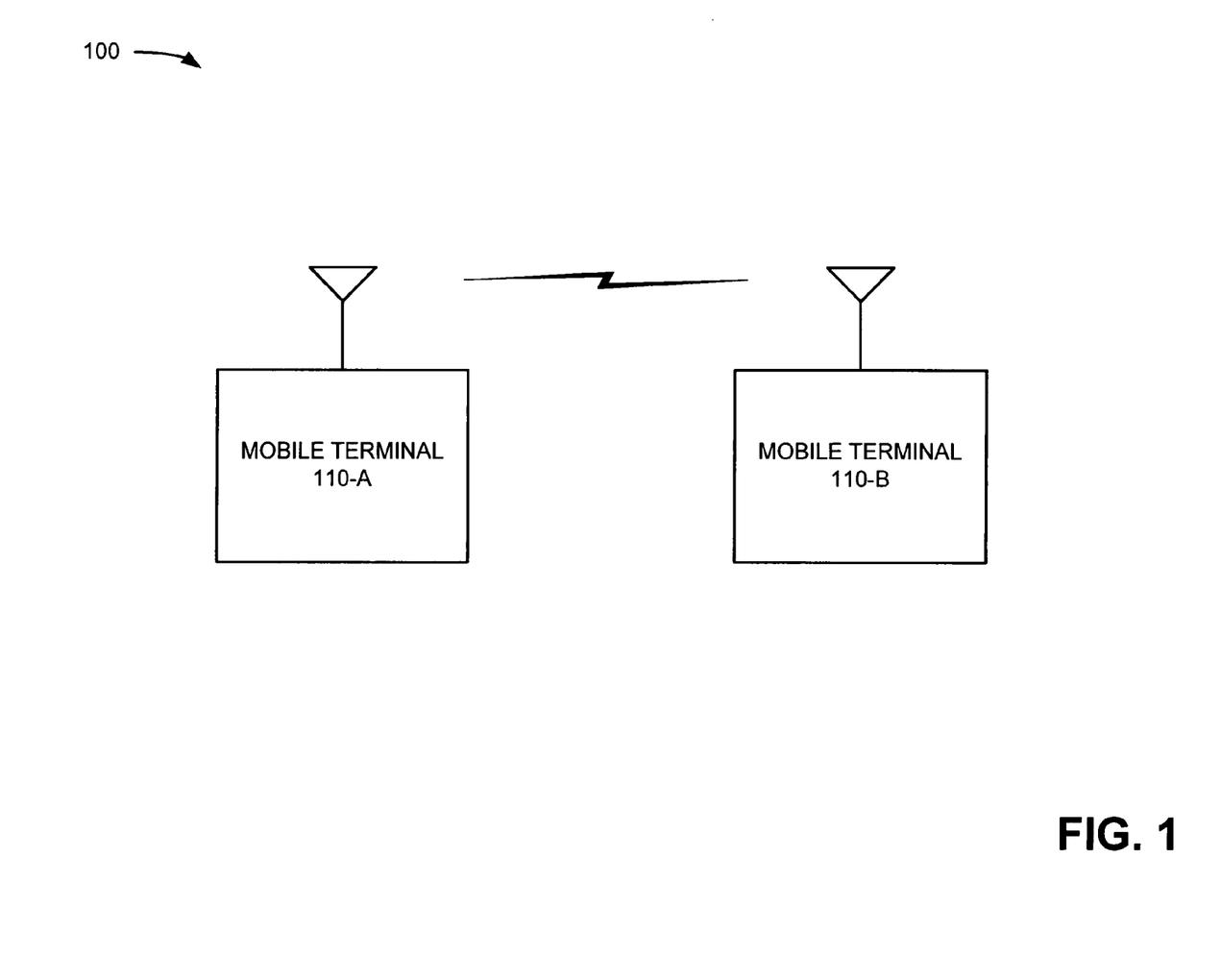
FIG. 1 is a diagram of an exemplary system according to an implementation consistent with the principles of the invention.

FIG. 1 is a diagram of an exemplary system 100 according to an implementation consistent with the principles of the invention. As illustrated in FIG. 1, system 100 may include mobile terminals 110-A and 110-B, referred to collectively as "mobile terminals 110." The number of mobile terminals illustrated in FIG. 1 is provided for simplicity. In practice, a typical system may include more mobile terminals than illustrated in FIG. 1.

Mobile terminals 110 may include cellular radiotelephones with or without a multi-line display; Personal Communications System (PCS) terminals that may combine a cellular radiotelephone with data processing, facsimile and data communications capabilities; Personal Digital Assistants (PDAs) that can include a radiotelephone, pager, Internet/intranet access, Web browser, organizer, calendar and/or a global positioning system (GPS) receiver; laptop and/or palmtop receivers or an appliance that includes a radiotelephone transceiver; and/or other similar types of devices. Mobile terminals 110 may also be referred to as "pervasive computing" devices.

In one implementation consistent with the principles of the invention, mobile terminals 110 may communicate wirelessly using a number of short distance wireless communication protocols. For example, mobile terminals 110 may communicate using the near field communication (NFC) protocol, which is a short-range wireless connectivity standard that uses magnetic field induction to enable communication between devices when they are touched together or brought within a few centimeters of each other. Mobile terminals 110 may also communicate using one or more other short distance wireless communication protocols, such as the Bluetooth protocol, the IEEE 802.11 protocol, etc. that may operate at longer distances.

Exemplary Mobile Terminal Configuration

Figure 2:
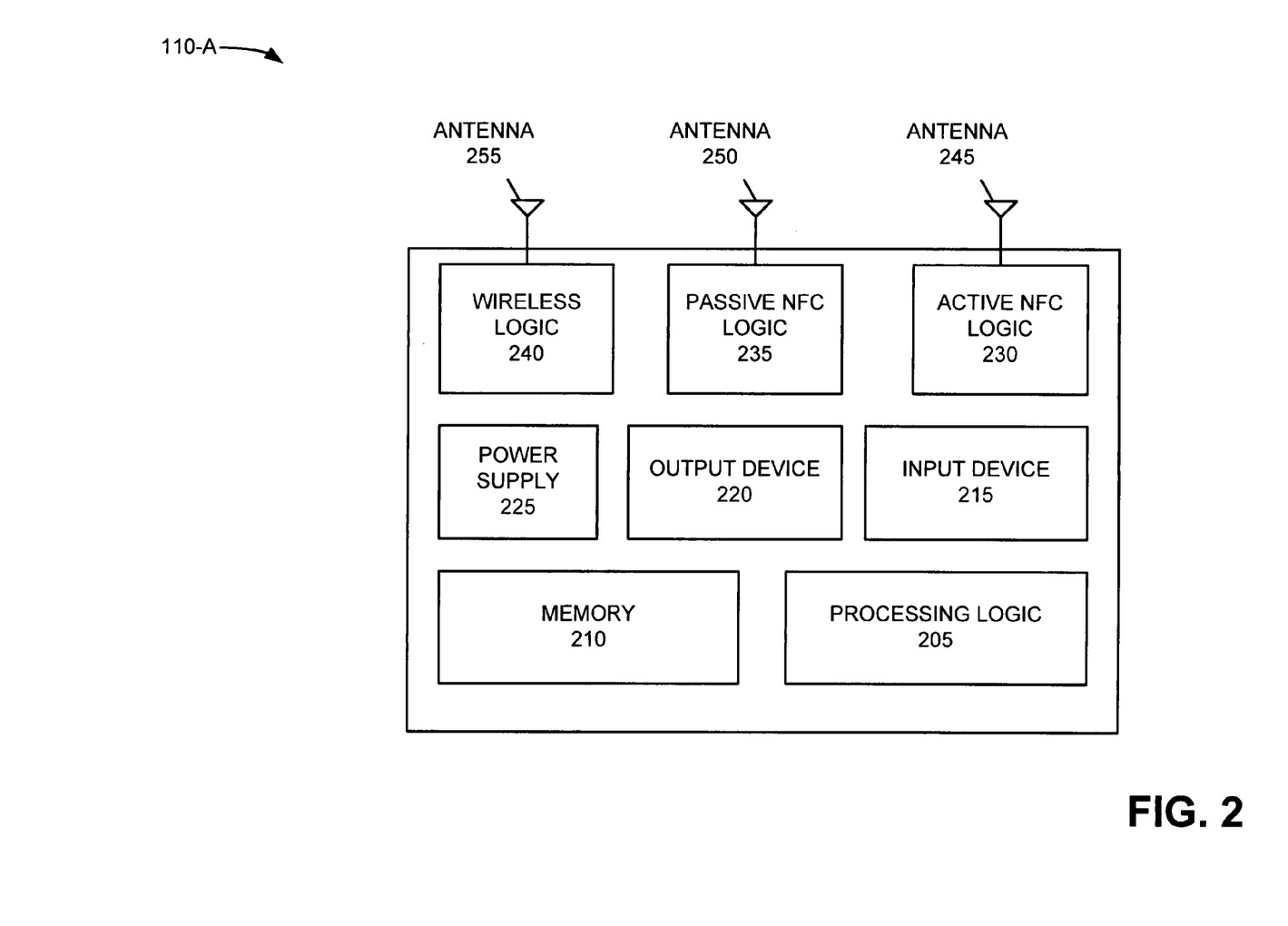
FIG. 2 is an exemplary diagram of a mobile terminal of FIG. 1.

FIG. 2 is an exemplary diagram of mobile terminal 110-A. It will be appreciated that mobile terminal 110-B may be similarly configured. As illustrated, mobile terminal 110-A may include processing logic 205, a memory 210, an input device 215, an output device 220, a power supply 225, active NFC logic 230, passive NFC logic 235, wireless logic 240, and antennas 245-255. It will be appreciated that mobile terminal 110-A may include other components (not shown) that aid in receiving, transmitting, and/or processing data. Moreover, it will be appreciated that other configurations are possible.

Processing logic 205 may include any type of processor or microprocessor that may interpret and execute instructions. In other implementations, processing logic 205 may be implemented as or include an application specific integrated circuit (ASIC), a field programmable gate array (FPGA), or the like. Memory 210 may include a random access memory (RAM) or another type of dynamic storage device that may store information and instructions for execution by processing logic 205, a read only memory (ROM) or another type of static storage device that may store static information and instructions for the processing logic 205, and/or some other type of magnetic or optical recording medium and its corresponding drive for storing information and/or instructions.

Input device 215 may include a device that permits a user to input information to mobile terminal 110-A, such as a keyboard, a keypad, a mouse, a pen, a microphone, one or more biometric mechanisms, and the like. Output device 220 may include a device that outputs information to the user, such as a display, a printer, a speaker, etc. Power supply 225 may include a battery, or the like, for providing power to the components of mobile terminal 110-A.

Active NFC logic 230 may include a transmitter device capable of transmitting data and control signals using the NFC protocol. For example, in one implementation consistent with the principles of the invention, active NFC logic 230 may transmit an activation signal to another mobile terminal that causes the other mobile terminal to activate its wireless logic. Active NFC logic 230 consumes power from power supply 225 when transmitting data and control signals.

Passive NFC logic 235 may include a receiver device capable of receiving data and control signals using the NFC protocol. Unlike active NFC logic 230, passive NFC logic 235 does not consume power from power supply 225. Instead, passive NFC logic 235 may receive a carrier field from another mobile terminal and use the power from that carrier field to activate wireless logic 240. Thus, passive NFC logic 235 does not consume power when receiving data and control signals, but rather draws its operating power from the electromagnetic field provided by the other mobile terminal. In one implementation consistent with the principles of the invention, passive NFC logic 235 may transmit an activation signal to wireless logic 240 in response to receiving an activation signal from another mobile terminal (or other device). Passive NFC logic 235 may transmit the activation signal, for example, via a bus within mobile terminal 110-A.

Wireless logic 240 may include a transceiver device capable of transmitting and receiving data and control signals using a short distance wireless communication protocol. The short distance wireless communication protocol may include, for example, the Bluetooth protocol, the IEEE 802.11 protocol, or any other short distance wireless communication protocol.

Antennas 245-255 may include, for example, one or more directional antennas and/or omni directional antennas.

As will be described in detail below, mobile terminal 110-A, consistent with the principles of the invention, may establish a short distance wireless connection with another device, such as mobile terminal 110-B. Mobile terminal 110-A may perform these operations and other operations in response to processing logic 205 executing software instructions contained in a computer-readable medium, such as memory 210. A computer-readable medium may be defined as a physical or logical memory device and/or carrier wave.

The software instructions may be read into memory 210 from another computer-readable medium or from another device via, for example, wireless logic 240. The software instructions contained in memory 210 may cause processing logic 205 to perform processes that will be described later. Alternatively, hardwired circuitry may be used in place of or in combination with software instructions to implement processes consistent with the principles of the invention. Thus, implementations consistent with the principles of the invention are not limited to any specific combination of hardware circuitry and software.

Exemplary Processing

Figure 3:
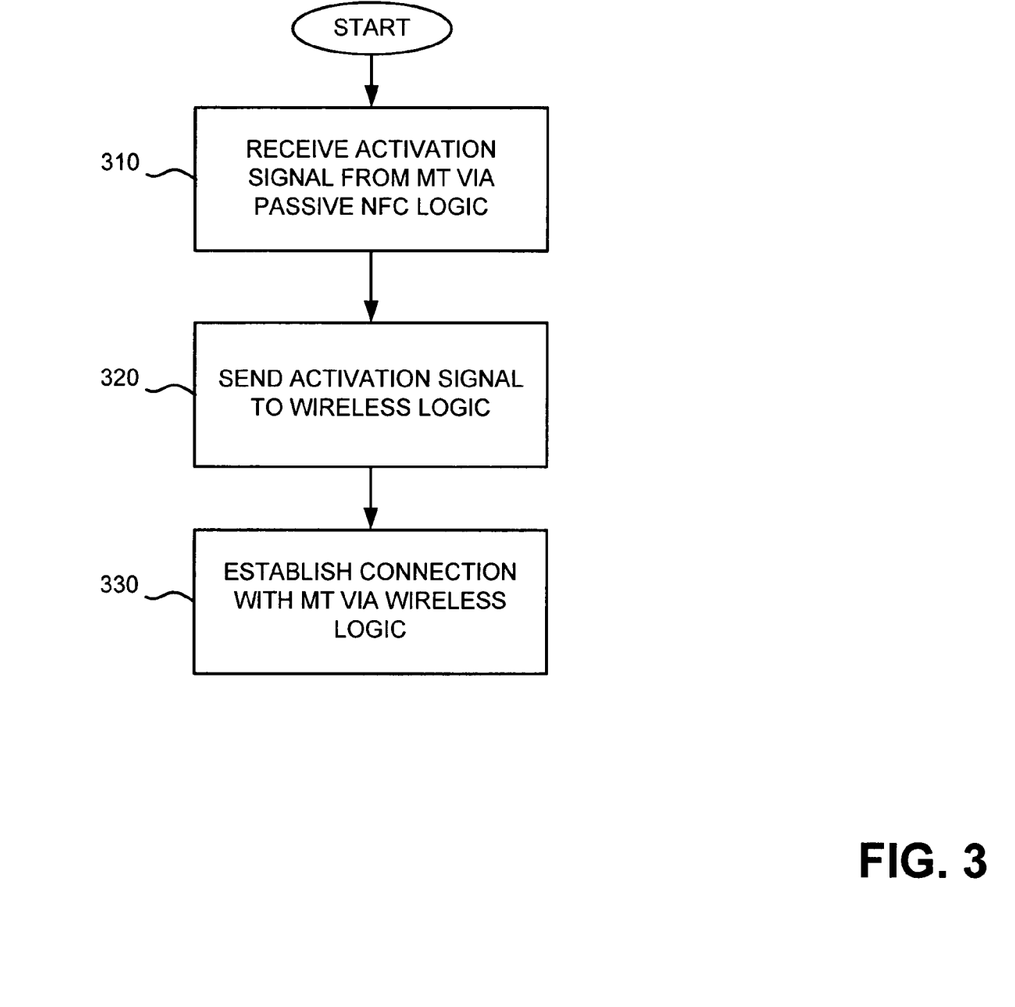
FIG. 3 is a flowchart of an exemplary process for establishing a short distance wireless connection in an implementation consistent with the principles of the invention.

FIG. 3 is a flowchart of an exemplary process for establishing a short distance wireless connection in an implementation consistent with the principles of the invention. It will be assumed for this process that mobile terminal 110-B wants to establish a short distance wireless connection with mobile terminal 110-A. It is further assumed that scanning has been deactivated on mobile terminal 110-A. Thus, mobile terminal 110-A devotes no power to NFC active logic 230, NFC passive logic 235, or wireless logic 240. Mobile terminal 110-A may be considered as operating in a low power (or nearly no power) mode.

Processing may begin with mobile terminal 110-B transmitting an NFC activation signal to all near-by mobile terminals. Mobile terminal 110-B may transmit the activation signal via NFC active logic 230. The sending of the activation signal may be triggered by some event. For example, in one implementation consistent with the principles of the invention, a user of mobile terminal 110-B may cause mobile terminal 110-B to transmit the activation signal in response to a command from the user (e.g., the user pressing one or more buttons on mobile terminal 110-B). In an alternative implementation consistent with the principles of the invention, mobile terminal 110-B may transmit the activation signal without the user's input (e.g., in response to a program running on mobile terminal 110-B). In one implementation consistent with the principles of the invention, mobile terminal 110-B may transmit information identifying a particular device to which mobile terminal 110-B desires to establish a connection as part of or in addition to the activation signal in a manner similar to, for example, FEEL. In this example, assume that mobile terminal 110-B transmits information identifying mobile terminal 110-A as part of or in addition to the activation signal.

Assume that mobile terminal 110-A is in close proximity to mobile terminal 110-B. Mobile terminal 110-A may receive the activation signal from mobile terminal 110-B (act 310) via, for example, passive NFC logic 235. Passive NFC logic 235 may draw power from the activation signal to transmit an activation signal (which may be the same as or different from the activation signal received by passive NFC logic 235) to wireless logic 240 (act 320). Mobile terminal 110-A may transmit the activation signal to wireless logic 240 via a bus within mobile terminal 110-A. In those situations where mobile terminal 110-B transmits identification information with the activation signal, mobile terminal 110-A may determine whether a received activation signal is intended for itself prior to sending the activation signal to wireless logic 240.

When received by wireless logic 240, the activation signal may cause wireless logic 240 to, in essence, wake up and begin attempting to establish a wireless connection (act 330). Wireless logic 240 may establish a short distance wireless connection with mobile terminal 110-B using existing connection schemes used in short distance wireless communication protocols. For example, a page or inquiry scan in the Bluetooth protocol may be activated in wireless logic 240 to allow mobile terminal 110-B to connect to mobile terminal 110-A. In one implementation consistent with the principles of the invention, wireless logic 240 may be configured to scan continuously in response to the activation signal to minimize connection setup time.

EXAMPLE

Figure 4:
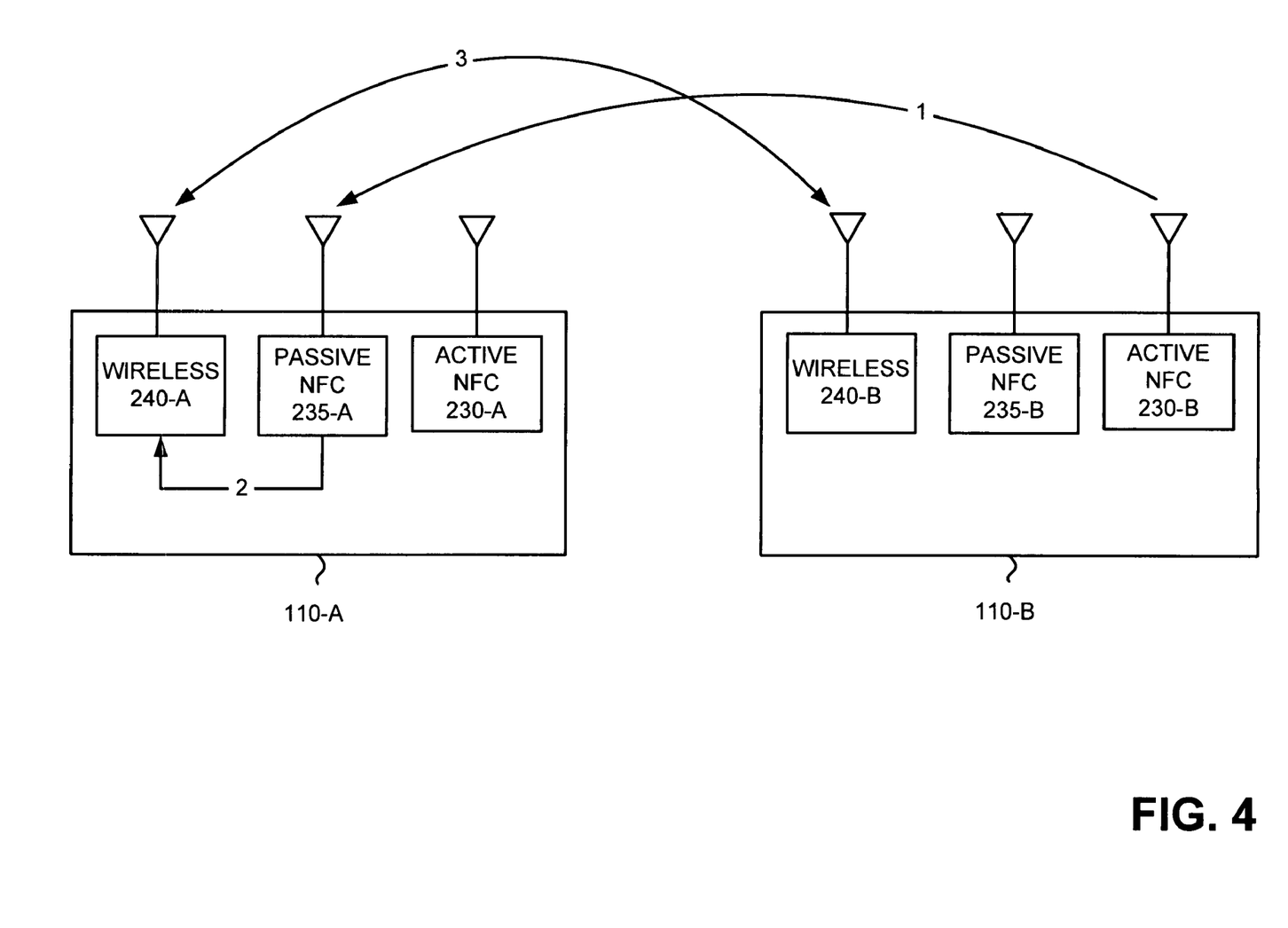
FIG. 4 is an exemplary diagram of the processing described with respect to FIG. 3.

The following example illustrates the above processing. FIG. 4 is an exemplary diagram of the processing described with respect to FIG. 3. Assume, for this example, that mobile terminal 110-B wants to establish a wireless connection with mobile terminal 110-A. The processing of FIG. 4 may begin with mobile terminal 110-B transmitting an activation signal (signal 1), via active NFC logic 230-B, to mobile terminal 110-A. Prior to receiving the activation signal, mobile terminal 110-A may operate in a low power (or nearly no power) mode. In this mode, scanning may be deactivated in mobile terminal 110-A and no power may be devoted to active NFC logic 230-A, passive NFC logic 235-A (which does not require power), and wireless logic 240-A.

Mobile terminal 110-A may receive the activation signal via passive NFC logic 235-A. Passive NFC logic 235-A may draw power from the activation signal to wake up wireless logic 240-A (signal 2). In response, wireless logic 240-A may, for example, perform a page or inquiry scan in the Bluetooth protocol to allow mobile terminal 110-B to connect to mobile terminal 110-A. Thereafter, mobile terminal 110-A and mobile terminal 110-B may transmit data via the established connection (connection 3).

In this way, a mobile terminal may operate in a totally passive mode, which greatly extends the battery life of the mobile terminal, until such time that another device (e.g., another mobile terminal) desires to establish a wireless connection with the mobile terminal. Connection setup time is not sacrificed since the mobile terminal begins scanning upon receiving the activation signal. In some situations, connection setup time can even be decreased because higher scanning frequencies can be used without sacrificing power consumption.

Moreover, since the NFC activation signal is a one-way signal (i.e., no signal needs to be transmitted back to the sending mobile terminal), the distance at which the two mobile terminals may be separated and still communicate the activation signal may exceed the distance that is generally available using NFC. In the simplest case, the activation signal transmitted using NFC does not need to carry any information with it. In fact, in one implementation consistent with the principles of the invention, the signal need only provide enough power to allow the receiving passive NFC logic to transmit its own activation signal to wake up the wireless logic. In some implementations, the passive NFC logic may be implemented as a simple passive antenna that is tuned for a specific frequency.

CONCLUSION

Implementations consistent with the principles of the invention may provide a totally passive mobile terminal that uses power from an activation signal from another mobile terminal to activate its wireless transceiver logic to begin establishing a wireless connection.

The foregoing description of preferred embodiments of the invention provides illustration and description, but is not intended to be exhaustive or to limit the invention to the precise form disclosed. Modifications and variations are possible in light of the above teachings or may be acquired from practice of the invention.

For example, while the description above focused on using the NFC protocol to send an activation signal, it will be appreciated that other wireless communication protocols could alternatively be used to transmit the activation signal. Moreover, although the description above focused on establishing a short distance wireless connection in response to receiving an activation signal, it will be appreciated that other types of wireless connections (other than short distance wireless connections) may be established in other implementations consistent with the principles of the invention.

While series of acts have been described with regard to FIGS. 3 and 4, the order of the acts may be modified in other implementations consistent with the principles of the invention. Further, non-dependent acts may be performed in parallel.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting the invention. Thus, the operation and behavior of the aspects were described without reference to the specific software code—it being understood that one of ordinary skill in the art would be able to design software and control hardware to implement the aspects based on the description herein.

Further, certain portions of the invention may be implemented as "logic" that performs one or more functions. This logic may include hardware, such as an application specific integrated circuit or a field programmable gate array, software, or a combination of hardware and software.

It should be emphasized that the term "comprises/comprising" when used in this specification is taken to specify the presence of stated features, integers, steps, or components, but does not preclude the presence or addition of one or more other features, integers, steps, components, or groups thereof.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method performed by a first mobile terminal, comprising:
   receiving, by a passive near field communication (NFC) receiver device, an NFC protocol signal from a second mobile terminal,
      where the NFC protocol signal, received from the second mobile terminal, is associated with information identifying the first mobile terminal, and
      where, prior to receiving the NFC protocol signal from the second mobile terminal, no power is devoted to a transceiver device within the first mobile terminal; and
   using, by the passive NFC receiver device and based on the information identifying the first mobile terminal, power from the NFC protocol signal, with which the information identifying the first mobile terminal is associated, to transmit a signal to the transceiver device within the first mobile terminal to begin establishing a wireless connection with the second mobile terminal, in response to receiving the NFC protocol signal transmitted from the passive NFC receiver device.

2. The method of claim 1, where the wireless connection includes a short distance wireless connection.

3. The method of claim 2, where the short distance wireless connection includes one of a Bluetooth connection or an IEEE 802.11 connection.

4. The method of claim 1, where the first mobile terminal performs no scanning prior to receiving the NFC protocol signal.

5. The method of claim 4, where the using the power includes:
   using power from the NFC protocol signal to activate scanning in the transceiver.

6. The method of claim 5, where the scanning includes a high frequency scan to decrease connection time.

7. The method of claim 1, further comprising:
   determining, prior to transmitting the signal within the first mobile terminal, whether the NFC protocol signal is intended for the first mobile terminal, based on the information identifying the first mobile terminal; and
   bypassing the transmission of the signal within the first mobile terminal when the NFC protocol signal is not intended for the first mobile terminal.

8. A mobile terminal comprising:
   a near field communication (NFC) receiver to:
      receive an NFC activation signal from another mobile terminal, the NFC activation signal including mobile terminal identification information,
      determine, based on the mobile terminal identification information, whether the NFC activation signal is intended for the mobile terminal, and
      transmit, in response to the NFC activation signal being determined to be intended for the mobile terminal, an activation signal using power from the NFC activation signal; and
   a wireless transceiver to:
      receive the activation signal, and
      establish a wireless connection with the other mobile terminal in response to receiving the activation signal.

9. The mobile terminal of claim 8, where when transmitting the activation signal, the NFC receiver is to:
   transmit the activation signal via a bus.

10. The mobile terminal of claim 8, where the mobile terminal includes a mobile telephone.

11. The mobile terminal of claim 8, where when establishing a wireless connection, the wireless transceiver is to:
    establish a short distance wireless connection with the other mobile terminal.

12. The mobile terminal of claim 8, where scanning is deactivated in the wireless transceiver prior to receiving the activation signal, and
    where when establishing a wireless connection, the wireless transceiver is to:
       perform scanning.

13. The mobile terminal of claim 12, where when performing the scanning, the wireless transceiver is to perform a high frequency scan.

14. The mobile terminal of claim 8, where the wireless transceiver consumes no power prior to receiving the activation signal.

15. The mobile terminal of claim 14, where the wireless transceiver is powered up in response to receiving the activation signal.

16. A network device comprising:
    means for receiving a first activation signal using a near field communication (NFC) protocol,
       where the first activation signal comprises network device identifying information, and
       where the first activation signal, comprising the network device identifying information, is received prior to causing a wireless transceiver within the network device to power up;
    means for determining, based on the network device identifying information, that the network device identifying information identifies the network device; and
    means for transmitting a second activation signal in response to receiving the first activation signal and in response to the means for determining that the network device identifying information identifies the network device, power for transmitting the second activation signal being drawn from the first activation signal, the second activation signal causing the wireless transceiver within the network device to power up.

17. The network device of claim 16, further comprising:
    means for determining, based on the network device identifying information, that the network device identifying information does not identify the network device, where, when the network device identifying information is determined not to identify the network device, the network device further comprises:

means for bypassing a transmission of the second activation signal.

18. A method comprising:

receiving, at a near field communication (NFC) receiver, an NFC signal from a mobile terminal, where the NFC signal received from the mobile terminal includes mobile terminal identifying information, and where the NFC signal is received from the mobile terminal prior to transmitting an activation signal to a wireless transceiver;

transmitting, via the NFC receiver, in response to receiving the NFC signal, and based on the mobile terminal identifying information included in the NFC signal, received from the mobile terminal, the activation signal to the wireless transceiver by drawing power from the received NFC signal; and automatically establishing, via the wireless transceiver, a short distance wireless connection with the mobile terminal in response to receiving the activation signal, where the automatically establishing the short distance wireless connection with the mobile terminal comprises performing a page or inquiry scan using a Bluetooth protocol.

19. The method of claim 18, where the short distance wireless connection includes at least one of a Bluetooth connection or an IEEE 802.11 connection.

\* \* \* \* \*